3,355,472
DIORGANO ANTIMONY (III) DITHIOCARBAMATES AND THE PREPARATION THEREOF
Nathaniel L. Remes, Livingston, and John J. Ventura, East Brunswick, N.J., assignors to M & T Chemicals Inc., New York, N.Y., a corporation of Delaware
No Drawing. Filed Apr. 24, 1964, Ser. No. 362,479
20 Claims. (Cl. 260—446)

ABSTRACT OF THE DISCLOSURE

In accordance with certain of its aspects, this invention relates to novel compositions of the formula $$R_aSb(S-\overset{S}{\underset{\|}{C}}-NR'_2)_{3-a}$$

wherein R is selected from the group consisting of alkyl, aryl, and alkenyl; R' is selected from the group consisting of hydrogen and hydrocarbon and $a$ is a positive integer less than 3.

---

This invention relates to novel organoantimony compounds and to methods for preparing the same.

It is an object of this compound to provide a novel class of organoantimony compounds and a method for preparing the same. It is a further object to provide novel organoantimony bactericides and fungicides.

In accordance with certain of its aspects, this invention relates to novel compositions of the formula $$R_aSb(S-\overset{S}{\underset{\|}{C}}-NR'_2)_{3-a}$$

wherein R is selected from the group consisting of alkyl, aryl, and alkenyl; R' is selected from the group consisting of hydrogen and hydrocarbon and $a$ is a positive integer less than 3.

The novel compositions of this invention may have the formula $$R_aSb(S-\overset{S}{\underset{\|}{C}}-NR'_2)_{3-a}$$

or $$R_aSb(SSCNR'_2)_{3-a}$$

wherein R may be selected from the group consisting of alkyl, aryl, and alkenyl. Typical alkyls may include methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, etc. Typical aryls may include phenyl, naphthyl, phenanthryl, etc. Typical alkenyls may include vinyl, allyl, 1-propenyl, 1-butenyl, 2-butenyl, 3-butenyl, etc. The radical R may be an inertly substituted alkyl, aryl or alkenyl radical, i.e. it may bear a substituent which does not react with other components of the process or interfere with the reaction. Typical inert substituents may include halogen, nitro, ether, aryl, alkyl, etc. Typical inertly substituted R radicals may include chlorophenyl, nitrophenyl, benzyl, tolyl, ethylphenyl, phenylethyl, chlorobutyl, 2-ethylhexyl, ethoxyethyl, methylcyclohexyl, 4-chloro-3-butenyl, etc. Preferably, R may be aryl and most preferably it may be phenyl.

The radical R' may be selected from the group consisting of hydrogen and hydrocarbon. When R' is hydrogen, the group —SSCNR$_2$ may be —SSCNH$_2$, the dithiocarbamate radical, i.e. the negative residual portion formed by the removal of a proton from dithiocarbamic acid.

When R' is hydrocarbon, it may typically be selected from the same group as R, i.e. it may be selected from the group consisting of alkyl, aryl and alkenyl, including inertly substituted alkyl, aryl and alkenyl. R' may typically be methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, vinyl, allyl, 1-propenyl, 1-butenyl, 2-butenyl, 3-butenyl, phenyl, naphthyl, phenanthryl, chlorophenyl, nitrophenyl, benzyl, tolyl, ethylphenyl, phenylethyl, chlorobutyl, 2-ethylhexyl, ethoxyethyl, methylcyclohexyl, 3-chloro-2-butenyl, etc. R and R' may be the same or different and the two R' radicals may be the same or different. R' may also include divalent hydrocarbons, preferably divalent alkyl (alkandiyl), which may be joined to form a cyclic structure including the nitrogen atom of the dithiocarbamate radical or which may form a bridged structure connecting two dithiocarbamate moieties. For example, R' may be methylene, ethylene, 1,2-propylene, trimethylene, 1,2-butylene, tetramethylene, pentamethylene, hexamethylene, octamethylene, decamethylene, o-phenylene, m-phenylene, p-phenylene, 4,4'-biphenylene, α-tolylene, xylylene, etc. The group SSCNR'$_2$ will be understood to include these cyclized and bridged structures. Thus, the compound R$_a$Sb(SSCNR'$_2$)$_{3-a}$ may include such illustrative structures as:

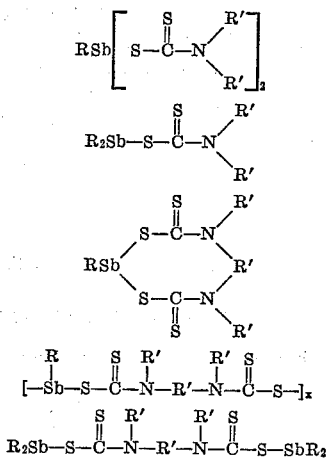

Other alternative structures will be apparent to those skilled in the art.

Preferably, R' may be lower alkyl including divalent lower alkyl. Lower alkyl radicals are those containing less than about 10 carbon atoms. Most preferably, R' may be methyl, ethyl, propyl, butyl, methylene, ethylene, propylene and butylene.

The radical —SSCNR$_2$ may be a dithiocarbamate radical, i.e. the negative residual portion of a dithiocarbamate radical. Illustrative dithiocarbamate radicals included within the scope of the invention are those derived from the following dithiocarbamic acids.

dithiocarbamic acid
methyldithiocarbamic acid
dimethyldithiocarbamic acid
ethyldithiocarbamic acid
diethyldithiocarbamic acid
n-propyldithiocarbamic acid
di-n-propyldithiocarbamic acid
isopropyldithiocarbamic acid
di-isopropyldithiocarbamic acid
butyldithiocarbamic acid
dibutyldithiocarbamic acid
octyldithiocarbamic acid
dioctyldithiocarbamic acid
dodecyldithiocarbamic acid
didodecyldithiocarbamic acid
hexadecyldithiocarbamic acid
phenyldithiocarbamic acid
diphenyldithiocarbamic acid cyclohexyldithiocarbamic acid
dicyclohexyldithiocarbamic acid
allyldithiocarbamic acid
diallyldithiocarbamic acid
benzyldithiocarbamic acid
dibenzyldithiocarbamic acid
methylenebisdithiocarbamic acid
ethylenebisdithiocarbamic acid
propylenebisdithiocarbamic acid
trimethylenebisdithiocarbamic acid
tetramethylenebisdithiocarbamic acid
hexamethylenebisdithiocarbamic acid
octamethylenebisdithiocarbamic acid
o-phenylenebisdithiocarbamic acid
m-phenylenebisdithiocarbamic acid
p-phenylenebisdithiocarbamic acid
α-tolylenebisdithiocarbamic acid
xylylenebisdithiocarbamic acid
4,4'-biphenylenebisdithiocarbamic acid
4-chloro-1,2-phenylenebisdithiocarbamic acid
dimethylenedithiocarbamic acid
pentamethylenedithiocarbamic acid
hexamethylenedithiocarbamic acid
N,N'-diethyl ethylenebisdithiocarbamic acid
N-methyl ethyldithiocarbamic acid
N,N'-dimethyl hexamethylenebisdithiocarbamic acid
N-(3-chloro-2-butenyl)-cyclohexyldithiocarbamic acid
N-cyclohexyl amyldithiocarbamic acid These compounds may be commercially available or may readily be prepared. Typically they may be made by the reaction of a primary of secondary amine, R'₂NH, with carbon disulfide in the presence of a base, typically sodium hydroxide or excess amine and typically in aqueous or alcoholic solution. The reactions may be represented as:

(I)  R'₂NH + CS₂ + NaOH ⟶ NaSSCNR'₂ + H₂O

(II)
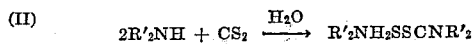
2R'₂NH + CS₂ →^{H₂O} R'₂NH₂SSCNR'₂

The compounds are normally prepared and used in the form of their alkali metal or substituted ammonium salts, since the free acids are generally unstable.

The novel compounds of this invention may be prepared by the process which comprises reacting together R$_a$SbX$_{3-a}$ wherein R is selected from the group consisting of alkyl, aryl, and alkenyl; X is a halogen having a molecular weight greater than 19; and $a$ is a positive integer less than 3; with a salt of a dithiocarbamic acid, thereby forming organoantimony dithiocarbamate; and recovering said organoantimony dithiocarbamate.

The novel organoantimony dithiocarbamates of this invention may be prepared from R$_a$SbX$_{3-a}$ wherein R is selected from the group consisting of alkyl, aryl, and alkenyl. Typically, R may be as defined supra. In the compound R$_a$SbX$_{3-a}$, $a$ may be a positive integer less than 3, i.e. $a$ may be 1 or 2. When $a$ is 1, R$_a$SbX$_{3-a}$ may be RSbX₂. When $a$ is 2, R$_a$SbX$_{3-a}$ may be R₂SbX.

X may be a halogen having a molecular weight greater than 19. Typically, X may be selected from the group consisting of chlorine, bromine and iodine, preferably may be chlorine. Typical illustrative R$_a$SbX$_{3-a}$ compounds which may be employed include:

diphenylantimony chloride
dibutylantimony bromide
diallylantimony iodide
ditolylantimony chloride
dibenzylantimony chloride
dichlorophenylantimony bromide
dicyclohexylantimony chloride
dioctylantimony iodide
phenylantimony dichloride
tolylantimony dibromide
butylantimony diiodide
benzylantimony dichloride
cyclohexylantimony dibromide
allylantimony diiodide
chlorophenylantimony dichloride
octylantimony dibromide These compounds may be readily available, or they may readily be prepared. For example, three moles of Grignard reagent RmgCl, say phenylmagnesium chloride, may be reacted with one mole of SbCl₃ to give R₃Sb, say triphenylantimony. Two moles of R₃Sb may then be reacted with one mole of SbCl₃ to give R₂SbCl, say diphenylantimony chloride, or one mole of R₃Sb may be reacted with two moles of SbCl₃ to give RSbCl₂, say phenylantimony dichloride. In addition to their usefulness in the process of this invention, these compounds are useful as bactericides, stabilizers, etc.

The preferred compounds may be diphenylantimony chloride and phenylantimony dichloride. Diphenylantimony chloride may be highly preferred.

The compound R$_a$SbX$_{3-a}$ may be reacted with a salt of a dithiocarbamic acid. Preferred salts of dithiocarbamic acids are those of the formula M(SSCNR'₂)$_b$ wherein R' is as defined supra, M is a cation selected from the group consisting of alkali metals, alkaline earth metals and ammonium, including substituted ammonium; and $b$ is the valence of M. For example, M may be sodium, potassium, magnesium, calcium, zinc, ammonium, dimethylammonium, diethylammonium, methylammonium etc. Preferably, M may be sodium or substituted ammonium. When the dithiocarbamate reactant is prepared in accordance with reaction (II), supra, M may be a cation of the formula R'₂NH₂. The dithiocarbamate salt may be used as such or it may be formed in situ by using the appropriate free acid (when obtainable) and base.

Examples of suitable dithiocarbamate salts may include:

ammonium dithiocarbamate
sodium methyldithiocarbamate
dimethylammonium dimethyldithiocarbamate
potassium ethyldithiocarbamate
diethylammonium diethyldithiocarbamate
calcium n-propyldithiocarbamate
magnesium di-n-propyldithiocarbamate
zinc isopropyldithiocarbamate
calcium di-isopropyldithiocarbamate
butylammonium butyldithiocarbamate
dibutylammonium dibutyldithiocarbamate
sodium octyldithiocarbamate
potassium dioctyldithiocarbamate
calcium dodecyldithiocarbamate
sodium didodecyldithiocarbamate
magnesium hexadecyldithiocarbamate
sodium phenyldithiocarbamate
sodium diphenyldithiocarbamate
potassium cyclohexyldithiocarbamate
dicyclohexylammonium dicyclohexyldithiocarbamate
potassium allyldithiocarbamate
zinc diallyldithiocarbamate
benzylammonium benzyldithiocarbamate
dibenzylammonium dibenzyldithiocarbamate
disodium methylenebis dithiocarbamate
dipotassium ethylenebisdithiocarbamate
calcium propylenebisdithiocarbamate
magnesium trimethylenebisdithiocarbamate
zinc tetramethylenebisdithiocarbamate
calcium hexamethylenebisdithiocarbamate
disodium octamethylenebisdithiocarbamate
diammonium o-phenylenebisdithiocarbamate
dipotassium m-phenylenebisdithiocarbamate
disodium p-phenylenebisdithiocarbamate
diammonium α-tolylenebisdithiocarbamate
diammonium xylylenebisdithiocarbamate
zinc 4,4'-diphenylenebisdithiocarbamate
disodium 4-chloro-1,2-phenylenebisdithiocarbamate
sodium dimethylenedithiocarbamate
magnesium pentamethylenedithiocarbamate hexamethyleneammonium hexamethylenedithiocarbamate
disodium N,N'-diethyl ethylenebisdithiocarbamate
sodium N-methyl ethyldithiocarbamate
disodium N,N'-dimethyl hexamethylenebisdithiocarbamate
calcium N-(3-chloro-2-butenyl)-cyclohexyldithiocarbamate
cyclohexylamylammonium N-cyclohexyl amyldithiocarbamate
cyclohexylamylammonium N-cyclohexyl amyldithiocarbamate In accordance with certain aspects of this invention, the reaction of $R_aSbX_{3-a}$ and $M(SSCNR'_2)_b$ may be represented as

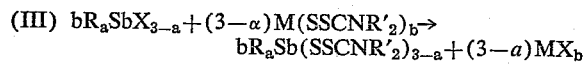

Or, as an illustrative specific embodiment

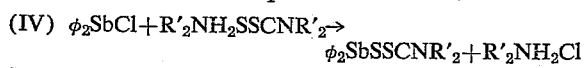

Those skilled in the art will readily understand from these illustrative equations the equivalent reactions involving bridged and cyclized dithiocarbamate anions and other specific embodiments of the invention.

Reaction of $R_aSbX_{3-a}$ and the salt of the dithiocarbamic acid may be effected by mixing the two reactants together. Preferably, they may be mixed together in the presence of an inert solvent which is a good solvent for at least one of the reactants. For example, the reaction may be carried out in ethers, such as diethyl ether, dibutylether, tetrahydrofuran, etc.; alcohols, such as ethanol, n-propanol, isopropanol, n-butanol, etc.; hydrocarbons such as benzene, toluene, n-hexane, petroleum ether, etc.; water, etc. Mixtures of two or more solvents may be used. Cyclic ethers such as tetrahydrofuran alcohols may be preferred since they are good solvents for both of the reactants. Hydrocarbon solvents may not be good solvents for the dithiocarbamate salts. When such solvents are employed, it is desirable to use vigorous agitation and to add the dithiocarbamate salt in the form of an aqueous solution or a finely divided solid. It is preferred that the $R_aSbX_{3-a}$ be first dissolved in the desired solvent, and the dithiocarbamate salt, preferably as a solution, be added thereto slowly over a period of time, say 15–240 minutes.

It is preferred that stoichiometric quantities of the two reactants be employed. Small excesses, say up to about 10% excess of either reactant, may be employed to ensure maximum conversion of a particular reactant. Larger excesses do not provide any apparent advantages and may complicate isolation of the desired product.

Moderate heating may be employed to accelerate the formation of product. Typically, reaction temperatures of about 30–150° C. are satisfactory. Higher temperatures, up to the decomposition temperature of the materials, may be employed, but such extreme temperatures are normally not required. Operating at the reflux temperature of the solvent may be most convenient. Reaction may be substantially complete in about 0.5–6 hours.

The product $R_aSb(SSCNR'_2)_{3-a}$ may be recovered in a number of ways, depending upon the reaction conditions, solvent, and nature of the reactants. For example, solid product may be precipitated from solution and recovered by filtration. Product $R_aSb(SSCNR'_2)_{3-a}$ may be retained in solution in a water-immiscible hydrocarbon solvent, e.g. benzene and washed with water to remove by-products. Where the desired product is a liquid, it may be leached directly with water.

The following compounds are illustrative of the novel compositions which are included within the scope of the invention.

diphenylantimony dithiocarbamate
dibutylantimony methyldithiocarbamate
diphenylantimony dimethyldithiocarbamate
ditolylantimony ethyldithiocarbamate
diallylantimony diethyldithiocarbamate
phenylantimony di(n-propyldithiocarbamate)
tolylantimony di(di-n-propyldithiocarbamate)
butylantimony di(isopropyldithiocarbamate)
allylantimony di(di-isopropyldithiocarbamate)
benzylantimony di(butyldithiocarbamate)
cyclohexylantimony di(dibutyldithiocarbamate)
chlorophenylantimony di(octyldithiocarbamate)
octylantimony di(dioctyldithiocarbamate)
dibenzylantimony dodecyldithiocarbamate
dichlorophenylantimony didodecyldithiocarbamate
dicyclohexylantimony hexadecyldithiocarbamate
dioctylantimony phenyldithiocarbamate
diphenylantimony diphenyldithiocarbamate
dicyclohexylantimony cyclohexyldithiocarbamate
phenylantimony di(dicyclohexyldithiocarbamate)
tolylantimony di(allyldithiocarbamate)
cyclohexylantimony di(diallyldithiocarbamate)
diphenylantimony benzyldithiocarbamate
dibenzylantimony dibenzyldithiocarbamate
di(diphenylantimony) methylenebis dithiocarbamate
di(ditolylantimony) ethylenebisdithiocarbamate
di(dicyclohexylantimony) propylenebisdithiocarbamate
phenylantimony trimethylenebisdithiocarbamate
tolylantimony tetramethylenebisdithiocarbamate
butylantimony hexamethylenebisdithiocarbamate
allylantimony octamethylenebisdithiocarbamate
benzylantimony o-phenylenebisdithiocarbamate
phenylantimony m-phenylenebisdithiocarbamate
di(diphenylantimony) p-phenylenebisdithiocarbamate
di(ditolylantimony) α-tolylenebisdithiocarbamate
chlorophenylantimony xylylenebisdithiocarbamate
di(diphenylantimony) 4,4'-biphenylenebisdithiocarbamate
di(diphenylantimony) 4-chloro-1,2-phenylenebisdithiocarbamate
diphenylantimony dimethylenedithiocarbamate
phenylantimony di(pentamethylenedithiocarbamate)
cyclohexylantimony di(hexamethylenedithiocarbamate)
tolylantimony N,N'-diethyl ethylenebisdithiocarbamate
butylantimony di(N-methyl ethyldithiocarbamate)
allylantimony N,N'-dimethyl hexamethylenebisdithiocarbamate
dichlorophenylantimony N-(3-chloro-2-butenyl)-cyclohexyldithiocarbamate
octylantimony di(N-cyclohexyl amyldithiocarbamate)

The novel products of this invention may be employed as an active component in bactericidal, germicidal, fungicidal, antiseptic, and similar compositions. They may be employed in paints, aerosol sprays, dusting powders, plastics, detergent compositions, agricultural sprays or the like to control a variety of organisms such as Gram-negative bacteria, Gram-positive bacteria, fungi, yeasts, molds, marine fouling organisms, etc. In the control of such organisms, they may be effective at concentrations as low as 16 parts per million. They may be applied to or combined in various substrates such as textiles, leather, paint, plastics including plastic sheet and foams, seeds, tubers, plants, wood, concrete, aqueous systems, etc. to prevent the growth of undesired organisms thereon or therein. In order to facilitate their application, they may be diluted or dispersed with a carrier, including solvents, emulsions, talc, diatomaceous earth, clay, etc. They may be used as the sole active ingredient of a biocidal composition or they may be combined with other active biocides such as long-chain quaternary amines, organotin compounds, especially triorganotins such as bis(tri-n-butyltin) oxide and triphenyltin acetate, etc.

The following illustrative experiments exemplify practice of specific embodiments of this invention and the novel products thereof. It will be apparent to those skilled in the art, in the light of the foregoing disclosure, that equivalent reactants, such as those hereinbefore described, may be substituted in the following examples to produce a wide variety of novel products.

*Example 1.—Diphenylantimony dimethyldithiocarbamate*

Dimethylammonium dimethyldithiocarbamate (16.6 grams, 0.1 mole) M.P. 132–133, was dissolved in 450 ml. of tetrahydrofuran. This was added dropwise to a refluxing solution of diphenylantimony chloride (31.1 grams, 0.1 mole) in 200 ml. of tetrahydrofuran over a 30 minute period. The reaction mixture was heated for 3½ hours at reflux, and filtered while still warm (40° C.) to remove precipitated dimethylamine hydrochloride (4.8 grams). The filtrate was a clear yellow liquid. It was concentrated to 100 ml. under vacuum and diluted with 400 ml. of isopropyl ether. The product precipitated as microcrystalline powder (25.8 grams, M.P. 110–112° C.; 66%). It was recrystallized from tetrahydrofuran-isopropyl alcohol (M.P. 116–116.2° C.).

*Analysis.*—Calcd. for $C_{15}H_{16}S_2NSb$: Sb, 30.73%; S, 16.18%. Found: Sb, 30.70%; S, 16.50%.

*Example 2.—Diphenylantimony dimethyldithiocarbamate*

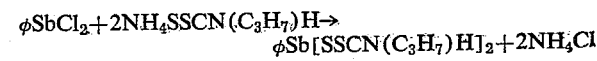

Dimethylammonium dimethyldithiocarbamate was prepared by adding 360 grams of a 25% aqueous solution of dimethylamine (2.0 moles) to 76 grams (1.0 mole) of carbon disulfide at 2° C. over a 55 minute period.

An aliquot of this (42 ml.; 0.1 mole) was added dropwise, with stirring to a solution of 31.14 grams (0.1 mole) of diphenylantimony chloride in 400 ml. of methanol, over a period of 30 minutes. The mixture was stirred for 3 hours at room temperature. During this period, the oil which had separated initially crystallized, and was filtered (29.0 grams; 73%; M.P. 107–110° C.). This was recrystallized from cyclohexane (M.P. 113.5–115° C.). The product did not depress the melting point of diphenyl antimony dimethyldithiocarbamate, as prepared in Example 1.

*Analysis.*—Calcd. for $C_{15}H_{16}S_2NSb$: Sb, 30.73%; S, 16.18%. Found Sb, 36.70%; S, 16.30%.

*Example 3.—Phenylantimonydi(n-propyldithiocarbamate)*

Ammonium n-propyldithiocarbamate (27.7 grams, 0.2 mole) may be dissolved in 900 ml. of tetrahydrofuran and the resulting solution, added to a refluxing solution of phenylantimony dichloride (27 grams, 0.1 mole) in 200 ml. of tetrahydrofuran over a period of 60 minutes. The reaction mixture may be heated and stirred for about 5 hours and filtered warm to remove precipitated ammonium chloride. The filtrate may be concentrated under vacuum to a total volume of about 100 ml. and the product phenylantimony di(n-propyldithiocarbamate) precipitated therefrom by addition of 400 ml. of isopropyl ether. The product may be separated by filtration and further purified by recrystallization from tetrahydrofuran-isopropyl alcohol.

*Example 4.—Di-n-butylantimony diethyldithiocarbamate*

$(C_4H_9)_2SbCl+(C_2H_5)_2NH_2SSCN(C_2H_5)_2 \rightarrow$
$(C_4H_9)_2SbSSCN(C_2H_5)_2+(C_2H_5)_2NH_2Cl$ Diethylammonium diethyldithiocarbamate (22.2 grams, 0.1 mole) may be dissolved in 550 ml. of tetrahydrofuran and the resulting solution added over a 45 minute period to a solution of di-n-butylantimony (27.1 grams, 0.1 mole) in 200 ml. of tetrahydrofuran at temperature of about 50° C. The resulting reaction mixture may be maintained at 45–55° C. with stirring for 6 hours and filtered warm to remove precipitated diethylamine hydrochloride. The filtrate may be concentrated under vacuum to a total volume of about 100 ml., and product di-n-butylantimony diethyldithiocarbamate precipitated by addition of 400 ml. of isopropyl ether. If desired, the product may be further purified by recrystallization from tetrahydrofuran-isopropyl alcohol.

*Example 5.—Di(diphenylantimony)ethylenebisdithiocarbamate*

Disodium ethylenebisthiocarbamate (25.6 grams, 0.1 mole) was dissolved in 100 ml. of water and the resulting solution added to 62.2 grams (0.2 mole) of diphenylantimony chloride in 800 ml. of methanol over a 45 minute period. The so-formed mixture may be stirred at room temperature for six hours, during which time product di(diphenylantimony) ethylenebisdithiocarbamate may precipitate from solution. Following the reaction period, the product may be separated from the remaining solution and recrystallized from cyclohexane.

Practice of specific embodiments of this novel invention may be observed from the foregoing experiments. As will be apparent to those skilled in the art, other of the reactants hereinbefore described may be substituted for those used in the illustrative examples.

In order to demonstrate the biological activity of the novel products of this invention, diphenylantimony dimethyldithiocarbamate was tested against common organisms including *Staphylococcus aureus*, a Gram-positive bacterium, and *Aerobacter aerogenes*, a Gram-negative bacterium. It was found that as little as 8 p.p.m. of diphenylantimony dimethyldithiocarbamate controlled the growth of *Staph. aureus* and as little as 16 p.p.m. controlled the growth of *A. aerogenes*.

Although this invention has been illustrated by reference to specific examples, numerous changes and modifications thereof which clearly fall within the scope of the invention will be apparent to those skilled in the art.

We claim:

1. A novel composition of the formula $$R_aSb(SSNCR'_2)_{3-a}$$

wherein R is selected from the group consisting of alkyl, aryl, and alkenyl; R' is selected from the group consisting of hydrogen and hydrocarbon; and *a* is an integer less than 3.

2. A novel composition as claimed in claim 1 wherein R is aryl.

3. A novel composition as claimed in claim 1 wherein R is phenyl.

4. A novel composition as claimed in claim 1 wherein *a* is 2.

5. A novel composition of the formula $R_2SbSSCNR'_2$  wherein R is aryl; and R' is selected from the group consisting of hydrogen and hydrocarbon.

6. A novel composition as claimed in claim 5 wherein R is phenyl.

7. A novel composition as claimed in claim 6 wherein R' is lower alkyl.

8. Diphenylantimony dithiocarbamate.

9. Diphenylantimony dimethyldithiocarbamate.

10. Diphenylantimony diphenyldithiocarbamate.

11. Diphenylantimony benzyldithiocarbamate.

12. Di(diphenylantimony) methylenebisdithiocarbamate.

13. Di(diphenylantimony) p-phenylenebisdithiocarbamate.

14. The process for preparing organoantimony dithiocarbamate which comprises reacting together $R_aSbX_{3-a}$ wherein R is selected from the group consisting of alkyl, aryl, and alkenyl; *a* is a positive integer less than 3; and X is a halogen having a molecular weight greater than 19; with a salt of a dithiocarbamic acid, thereby forming organoantimony dithiocarbamate; and recovering said organoantimony dithiocarbamate.

15. The process for preparing organoantimony dithiocarbamate of the formula $R_aSb(SSCNR'_2)_{3-a}$ wherein R is selected from the group consisting of alkyl, aryl, and alkenyl; R' is selected from the group consisting of hydrogen and hydrocarbon; and $a$ is a positive integer less than 3; which comprises mixing together as reactants $R_aSbX_{3-a}$ wherein X is a halogen having a molecular weight greater than 19; with $M(SSCNR'_2)_b$ wherein M is selected from the group consisting of alkali metals, alkaline earth metals, and ammonium, and $b$ is the valence of M; in the presence of an inert solvent which is a solvent for at least one of said reactants; thereby forming product $$R_bSb(SSCNR'_2)_{3-a}$$

and recovering said product.

16. The process claimed in claim 15 wherein R is phenyl.

17. The process claimed in claim 15 wherein $a$ is 2.

18. The process claimed in claim 15 wherein M is $R'_2NH$.

19. The process claimed in claim 15 wherein X is chlorine.

20. The process for preparing organoantimony dithiocarbamate of the formula $R_2SbSSCNR'_2$ wherein R is phenyl and R' is lower alkyl; which comprises mixing together as reactants $R_2SbCl$ and $R'_2NH_2SSCNR'_2$ in the presence of an inert solvent which is a solvent for at least one of said reactants, thereby forming product $$R_2SbSSCNR'_2$$

and recovering said product.

No references cited.

TOBIAS E. LEVOW, *Primary Examiner.*

W. F. W. BELLAMY, *Assistant Examiner.*